US009702336B2

(12) United States Patent
Markham et al.

(10) Patent No.: US 9,702,336 B2
(45) Date of Patent: Jul. 11, 2017

(54) LOW PROFILE OCEAN PUMP ARRAY GENERATION STATION

(71) Applicants: Stephen J. Markham, Lower Gwynedd, PA (US); Christopher J. Markham, Lower Gwynedd, PA (US)

(72) Inventors: Stephen J. Markham, Lower Gwynedd, PA (US); Christopher J. Markham, Lower Gwynedd, PA (US)

(73) Assignees: Stephen J. Markham, Lower Gwynedd, PA (US); Christopher J. Markham, Lower Gwynedd, PA (US)

( * ) Notice: Subject to any disclaimer, the term of this patent is extended or adjusted under 35 U.S.C. 154(b) by 162 days.

(21) Appl. No.: 14/869,295

(22) Filed: Sep. 29, 2015

(65) Prior Publication Data

US 2016/0097369 A1   Apr. 7, 2016

Related U.S. Application Data

(60) Provisional application No. 62/059,335, filed on Oct. 3, 2014.

(51) Int. Cl.
*F03B 13/20* (2006.01)
*F03B 13/18* (2006.01)

(52) U.S. Cl.
CPC ............ *F03B 13/20* (2013.01); *F03B 13/187* (2013.01); *F03B 13/1855* (2013.01); *F03B 13/1895* (2013.01); *F05B 2240/40* (2013.01); *F05B 2240/95* (2013.01); *F05B 2240/97* (2013.01); *Y02E 10/38* (2013.01)

(58) Field of Classification Search
CPC .. F03B 13/1855; F03B 13/1895; F03B 13/20; F03B 13/22; F05B 2240/95; F05B 2240/97; Y02E 10/38
USPC ................................ 60/497, 504; 290/42, 53
See application file for complete search history.

(56) References Cited

U.S. PATENT DOCUMENTS

| 2006/0233613 | A1* | 10/2006 | Welch, Jr. | ................. E02B 9/08 405/76 |
| 2011/0097220 | A1* | 4/2011 | Tillotson | ............... F03B 13/189 417/333 |
| 2012/0227395 | A1* | 9/2012 | Gordon | ............... F03B 13/1885 60/499 |
| 2013/0205769 | A1* | 8/2013 | Fievez | .................... B63B 22/00 60/501 |

\* cited by examiner

*Primary Examiner* — Jorge Leon, Jr.
(74) *Attorney, Agent, or Firm* — White and Williams LLP

(57) ABSTRACT

A system for generating electricity in a moving water environment, including a single point of contact securing mechanism in contact with a floor of the moving water environment, the securing mechanism comprising a weight and a cable, a pump including a bottom section mechanically coupled to the securing mechanism via the cable, the bottom section comprising a water input valve and a bottom water conduit, a top section slidably coupled to the bottom section, the top portion comprising a water output valve and a top water conduit receiving water from the bottom water conduit, a spring mechanism coupled to the bottom section and the top section, and a buoyancy device coupled to the top pump section.

5 Claims, 4 Drawing Sheets

Single Pump Assembly

1) Floatation Ball
2) Upper Pump Assembly
3) One Way Valve - Water Out
4) Upper Limit Stop for Lower Pump Assembly
5) Pump Gasket
6) Lower Pump Assembly
7) Contraction Spring
8) Maximum Extension Cable
9) One Way Valve - Water In
10) Sea Weight
11) Water Flapper Valve
12) Support Wires
13) Pin Hole for Removal of Air Bubbles Sucked in through 9
14) Sea Weight Cable Single Array Assembly 25) Water Particle Displacement Waive Displacement

LOW PROFILE OCEAN PUMP ARRAY GENERATION STATION

PRIORITY

This application claims the benefit of U.S. Provisional Application No. 62/059,335, filed Oct. 3, 2014, the disclosure of which is incorporated herein by reference in its entirety.

BACKGROUND

This application relates to a low profile pump array generation station for generating electricity in a moving water environment.

SUMMARY

A system for generating electricity in a moving water environment, including a single point of contact securing mechanism in contact with a floor of the moving water environment, the securing mechanism comprising a weight and a cable, a pump including a bottom section mechanically coupled to the securing mechanism via the cable, the bottom section comprising a water input valve and a bottom water conduit, a top section slidably coupled to the bottom section, the top portion comprising a water output valve and a top water conduit receiving water from the bottom water conduit, a spring mechanism coupled to the bottom section and the top section, and a buoyancy device coupled to the top pump section.

DESCRIPTION

The attached drawings outline a design for a low profile Ocean Pump Array Generation Station. This station may have a low profile which allows it to be placed close to the shoreline without disturbing the ocean view from the shoreline.

In addition this pumping station may have only one point of attachment to the ocean floor. This allows for minimal impact to the environment. The single point of contact may be designed to hold the Pump Array in place but may also be design to act as an artificial reef to support the local sea life.

Finally in addition to generating electricity, the floating Pump Array may provide shelter for many small marine fish species allowing them to hide from large predators. Supporting the local fish populations.

The following describes the operation of the Sea Pump and Multi Pump Array.

Starting with the sea pump itself (100), the basic operation is the expansion and contraction of the sea pump to suck water in and pump water out which is piped to a turbine to generate electricity. Turbine or electrical components may be available off the shelf.

Figure 1:
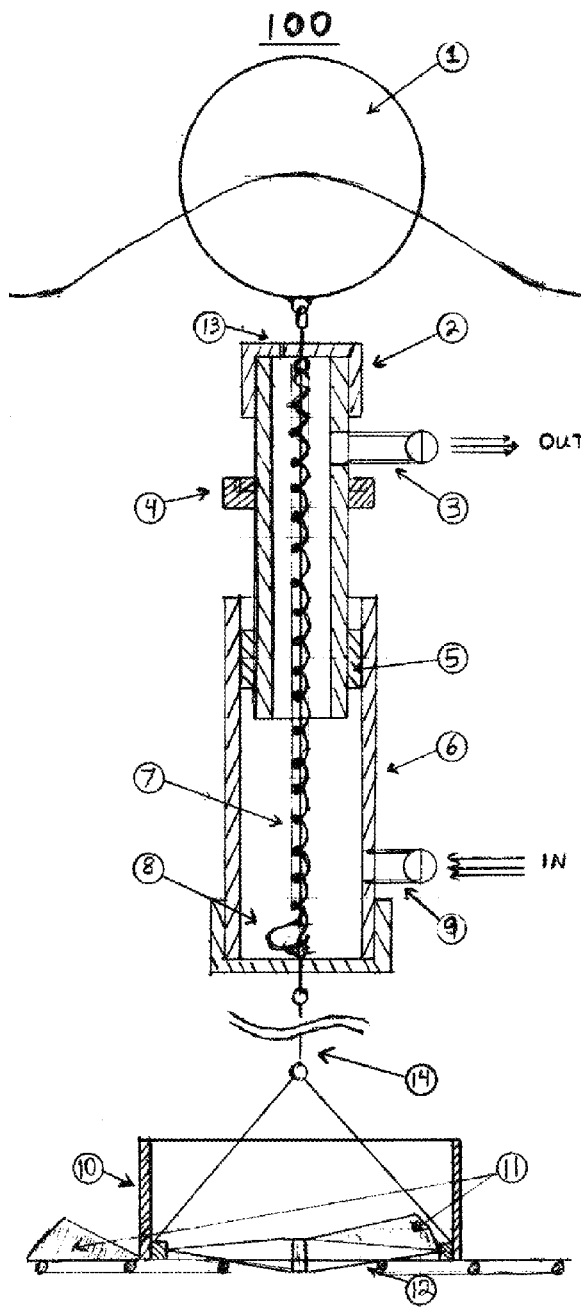
FIG. 1 shows a cross-sectional side view of a single pump according to an aspect of the system of the present disclosure.

The sea pump shown in FIG. 1 includes a sea weight (FIG. 1—item 10) at the bottom of the apparatus looking like a giant jelly fish while in operation. The sea pump's upper and lower halves (FIG. 1—item 2 & 6) are connected by a contraction spring (FIG. 1—item 7). The top half (FIG. 1—item 2) of the sea pump has a one way valve (FIG. 1—item 3) which allows water to be pushed out of the sea pump while the bottom half of the pump has a one way valve (FIG. 1—item 9) allowing water to be sucked into the sea pump. As the two halves (FIG. 1—item 2 & 6) are pulled apart and contract on one another, water is pumped through the system.

The expansion and contraction of the sea pump is obtained by several outside forces working on the pump. First the Flotation Ball (FIG. 1—item 1), this applies an upward force each time a wave passes by the pump. This upward force is counter acted by the drag of the Sea Weight (figure one—item 10). These two forces create the expansion and suction in the sea pump filling it with water through the bottom intake valve (FIG. 1—item 9)

The second force the sea pump takes advantage of is wave displacement. This phenomenon acts on the water particles in the wave moving them up and down in a circular motion (see FIG. 4—item 25). The amount of displacement up and down of each particle depends on the depth of the water particle. The equation for determining the maximum depth of water displacement where water particles are no longer affected by the passing wave is D=L/2 where (D) is depth and (L) is length between waves.

The sea weight (FIG. 1—item 10) takes advantage of this by attaching itself to the sea pump by a cable (FIG. 1—item 14) which is of sufficient length to stay below the wave displacement thus increasing its downward drag when the upper half 2 of the pump is forced upward by a wave.

Once the wave has passed the forces pulling the pump apart have ceased and the sea pump's internal contraction spring (FIG. 1—item 7) contracts forcing water out the top exit valve (FIG. 1—item 3). While the sea pump is dropping back down off the top of the wave the water flapper valves (FIG. 1—item 11) on the sea weight (FIG. 1—item 10) open allowing the sea weight to sink back to its original position ready for the next wave to pass.

Other sea pump items (FIG. 1) not mentioned in the narrative above include,

Item 4—Upper Limit Stop for Lower pump Assembly. Prevents the lower pump assembly 6 from moving too high on the upper pump assembly 2.

Item 5—Pump Gasket—ensures a tight fit between the upper and lower halves 2 and 6 of the sea pump.

Item 8—Maximum Expansion Cable—This cable runs up the center of the spring and prevents the sea pump from being pulled apart. The cable will allow the sea pump to expand to its upper limit and then expand no further.

Item 12—Support wires—create a base for the water flapper valves (item 11) to rest on when not activated.

Item 13—Pin Hole—this pin hole allows for the removal of random air bubbles sucked in through the intake valve which would over time build up inside the sea pump and reduce its efficiency.

Figure 2:
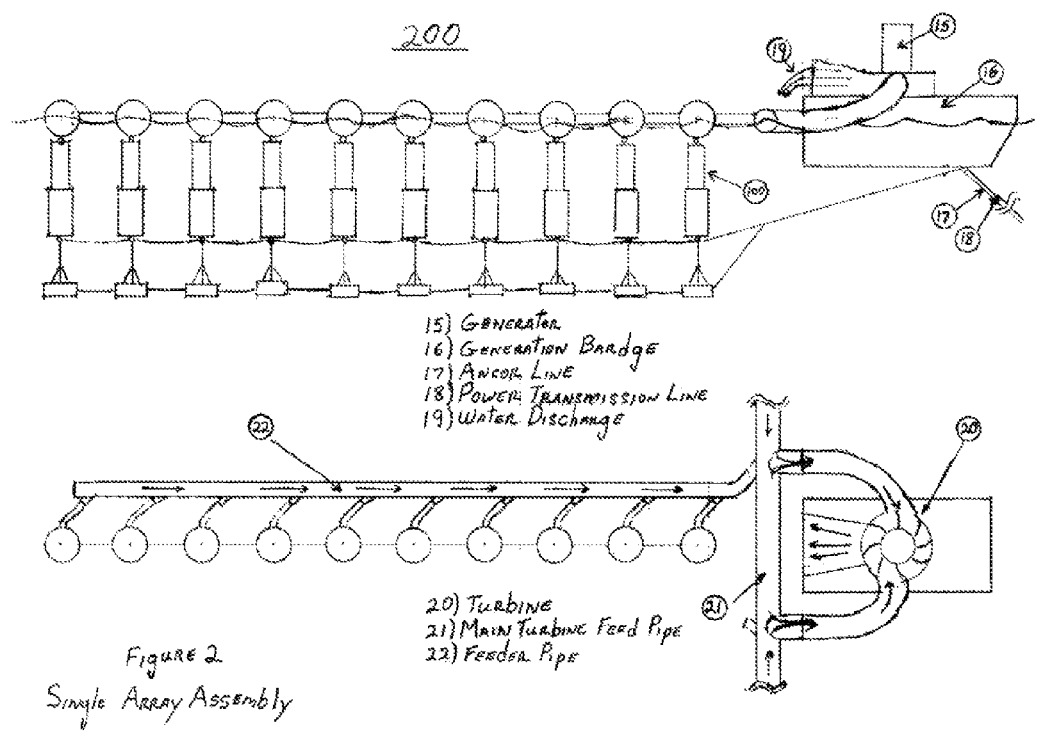
FIG. 2 shows views of a single array of pumps according to an aspect of the system of the present disclosure.

FIG. 2 Single Array Assembly (200)

In order to pump a constant flow of water into the turbine generator, multiple Sea Pumps (100) connected via their exits valves/pipes are attached to a shared feeder pipe (FIG. 2—item 22) connected to the main feed pipe (FIG. 2—item 21) leading to a low profile generator barge (FIG. 2—item 16). As waves propagate down the single array assembly (200) some sea pumps will be expanding while others will be contacting creating a constant flow of water through the shared pipe connected to the Main Turbine Feed Pipe (FIG. 2—item 21) on the generation barge (FIG. 2—item 16). This barge houses the water turbine (FIG. 2—item 20) and electrical generator (FIG. 2—item 15). It is also connected to the sea floor by a single point of contact (FIG. 2—item 17) allowing the entire assembly to be held in place. Its power transmission line cable (FIG. 2—item 18) also runs along the single point of contact cable to the sea floor and back to land for connection to the electrical grid.

Figure 3:
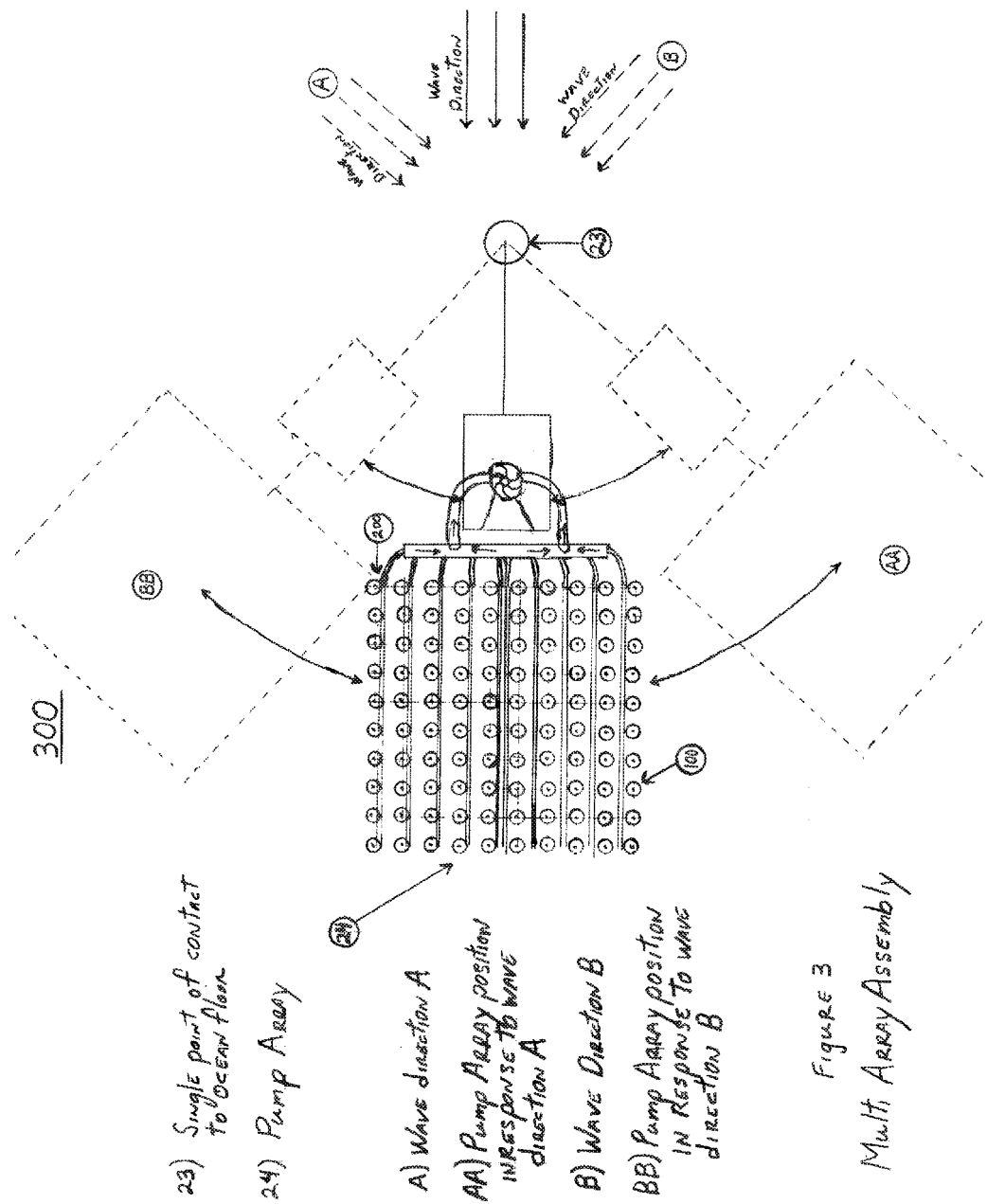
FIG. 3 shows a top view of a multi array of pumps according to an aspect of the system of the present disclosure.

FIG. 3 Multi Array Assembly (300)

To increase the output power of the turbine generator multiple Single Array's (200) may be combined to create a Multi Array Assembly (300). Each single array assembly's feeder pipe (FIG. 2—item 22) is attach to the Main turbine feed pipe (FIG. 2—item 21) multiplying the amount of water delivered to the turbine by the number of single arrays (200) attached to the main turbine pipe (FIG. 2—item 21).

The single point of contact to the sea floor (FIG. 3—item 23) also allows for the Multi Pump Array (FIG. 3—item 24) to self-adjust to the direction of the oncoming waves (FIG. 3—Item A, AA & B, BB). Allowing for waves to come from any direction.

The low profile of the entire system—Flotation Balls (FIG. 1—item 1) and Low Profile Generation Barge (FIG. 2 item 16) allows the system to be located close to the coastline without causing unwanted view distractions and minimizing the transition distance of the electricity.

Figure 4:
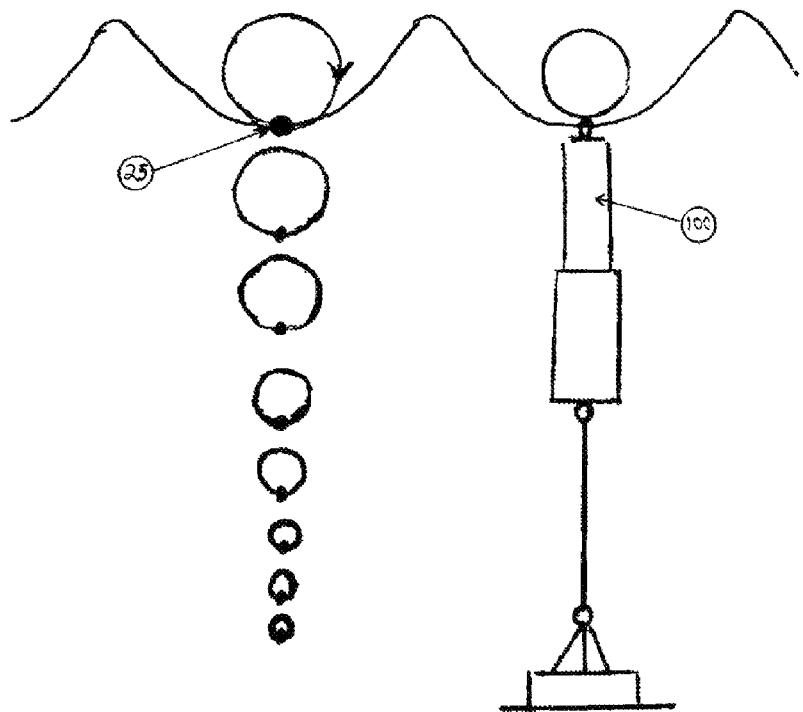
FIG. 4 shows a side view of a pump according to an aspect of the system of the present disclosure in relation to water particle displacement.

FIG. 4 shows the displacement of water particles in the waves (FIG. 4—item 25) and arrangement of the pump system (100) in relation thereto.

Numerous additional modifications and variations of the present disclosure are possible in view of the above teachings. It is therefore to be understood that within the scope of the appended claims, the present disclosure may be practiced other than as specifically described herein.

Persons having skill in the art will realize that the embodiments disclosed herein are exemplary, and that deviations from same without altering the primary features of the invention may also permit the invention, and/or one or more aspects of same, to perform its intended function.

The invention claimed is:

1. A system for generating electricity in a moving water environment, comprising:
    a single point of contact securing mechanism in contact with a floor of the moving water environment, the securing mechanism comprising a weight and a cable;
    a pump comprising:
        a bottom section mechanically coupled to the securing mechanism via the cable, the bottom section comprising a water input valve and a bottom water conduit;
        a top section slidably coupled to the bottom section, the top section comprising a water output valve, a top water conduit receiving water from the bottom water conduit, a slide stop assembly, and an air release valve arranged near a top most portion of the top section;
    a spring mechanism coupled to the bottom section and the top section; and
    a buoyancy device coupled to the top section.

2. The system of claim 1, wherein the securing mechanism further comprises support wires.

3. The system of claim 1, further comprising a shared feeder conduit coupled to the water output valve.

4. The system of claim 1, further comprising a shared feeder conduit coupled to water output valves of a plurality of pumps.

5. The system of claim 4, wherein the plurality of pumps are arranged substantially linearly.

* * * * *